Dec. 30, 1947.   L. W. FALK   2,433,510
GEAR TESTING APPARATUS
Filed Jan. 5, 1945   3 Sheets-Sheet 1

Louis W. Falk
INVENTOR.

BY
ATTORNEY.

Dec. 30, 1947.  L. W. FALK  2,433,510
GEAR TESTING APPARATUS
Filed Jan. 5, 1945   3 Sheets-Sheet 2
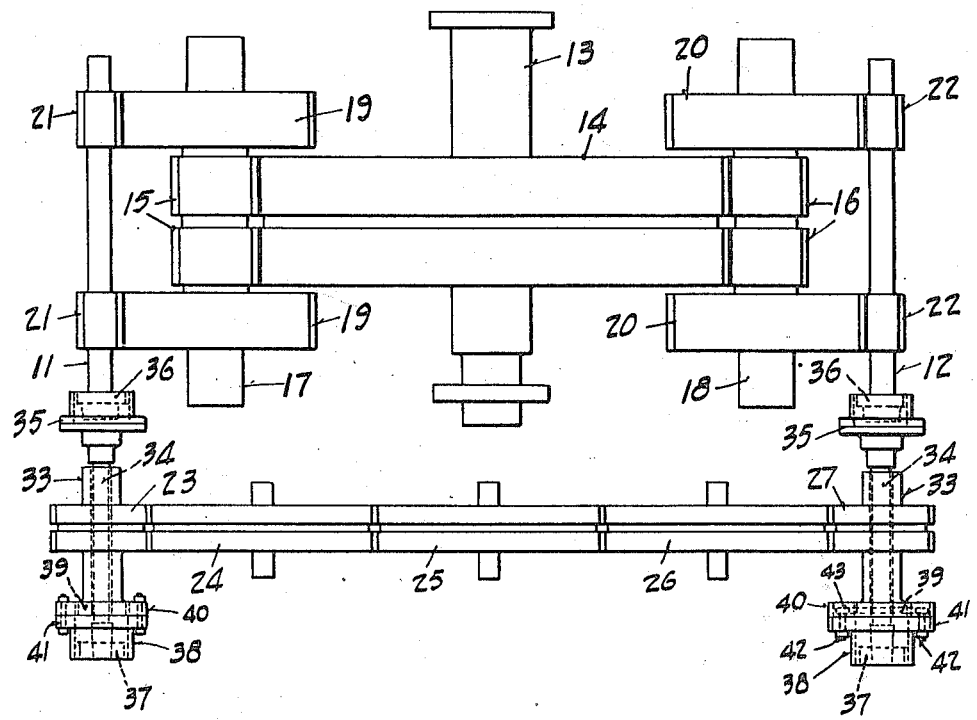
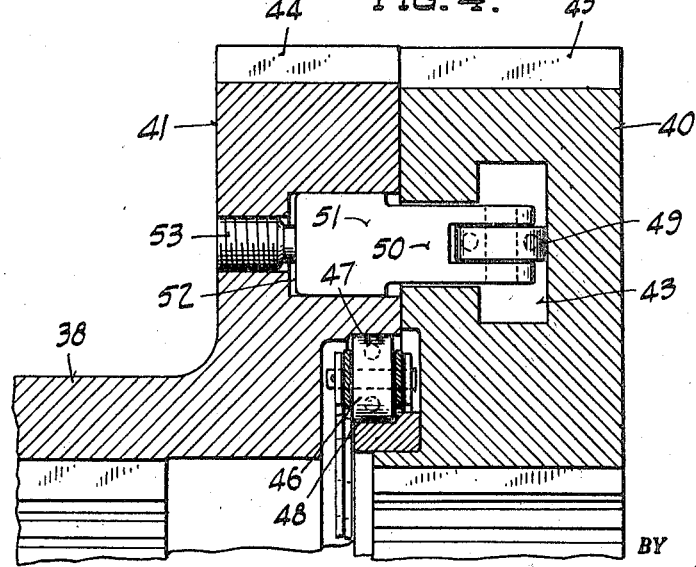
Louis W. Falk
INVENTOR.
BY
ATTORNEY.

Dec. 30, 1947.   L. W. FALK   2,433,510
GEAR TESTING APPARATUS
Filed Jan. 5, 1945   3 Sheets-Sheet 3
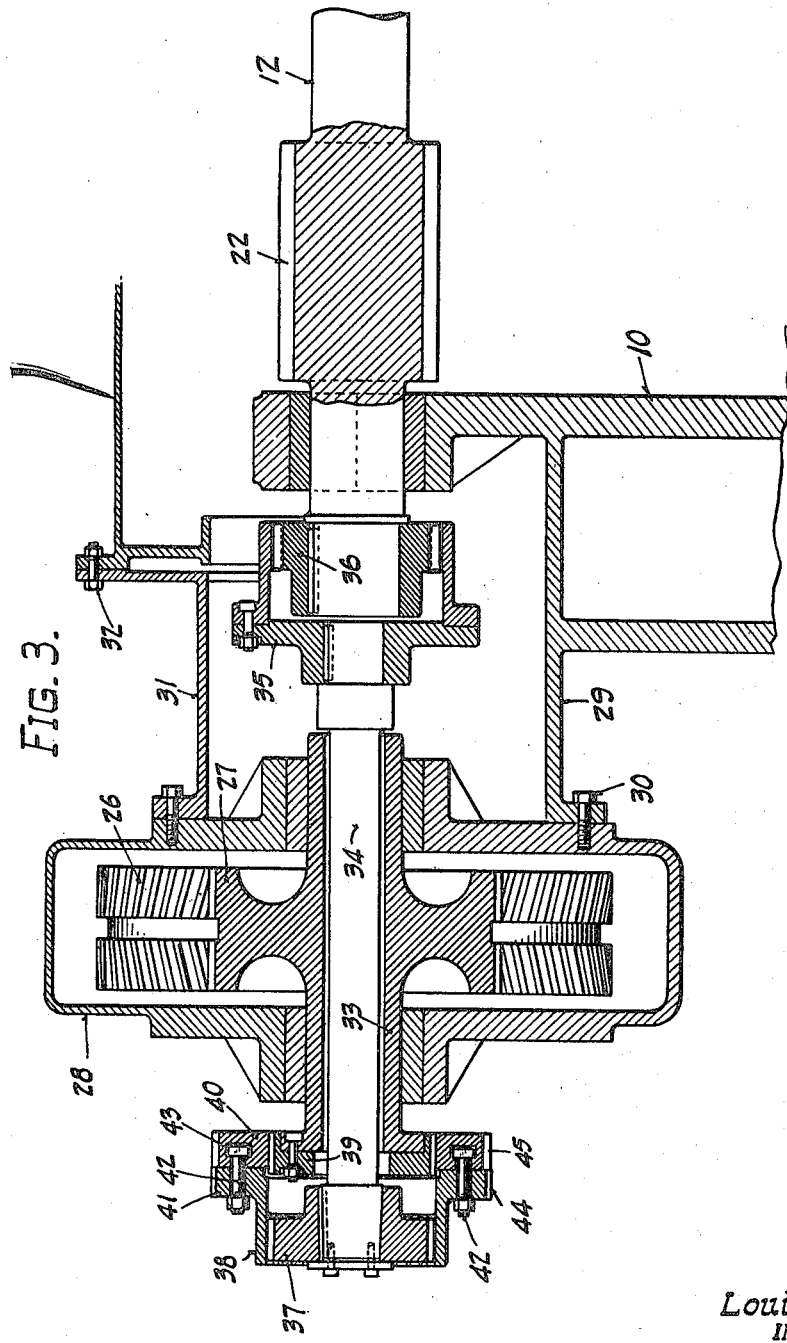
Louis W. Falk
INVENTOR.
BY *Ralph W. Brown*
ATTORNEY.

Patented Dec. 30, 1947

2,433,510

UNITED STATES PATENT OFFICE 2,433,510

GEAR TESTING APPARATUS

Louis W. Falk, Milwaukee, Wis., assignor to The Falk Corporation, Milwaukee, Wis., a corporation of Wisconsin Application January 5, 1945, Serial No. 571,516

6 Claims. (Cl. 73—162)

This invention relates to torque loading devices for use in testing power transmission gearing.

Adequate testing of power transmission machinery before it leaves the manufacturer is highly important, particularly in the case of heavy duty transmissions. In many instances however it is wholly impracticable or impossible to test such devices under actual working conditions at the place of manufacture, because of the size and nature of the prime mover and of the driven mechanism or load with which such transmissions are to be used and the consequent expense and difficulties involved in providing or duplicating such equipment for test purposes only.

In the case of heavy duty gear sets of the multiple pinion type, involving a plurality of drive shafts, satisfactory testing has been accomplished by coupling the drive shafts of one of such sets to the drive shafts of another in such manner as to cause each to impose and maintain a torque load on the other. Such testing however requires pairs of sets in which each set is a mirrored or reversed counterpart of the other and such sets are not always available.

One object of the present invention is to provide a device for application to a power transmission gear set capable of subjecting the latter to conditions closely approximating those imposed in actual use so as to make it possible to conveniently and adequately test the same. This I have accomplished by the provision of a simple readily applied unit capable of imposing on a gear set an artificial or static torque load substantially equal to the load to which the set is to be subjected in normal use and also capable of maintaining that load while the set is caused to idle at normal operating speeds.

Other more specific objects and advantages will appear, expressed or implied from the following description of an illustrative embodiment of the present invention.

In the accompanying drawings:

Fig. 2 is a diagrammatic plan view of gearing included in the torque loading device and gear set of Fig. 1.

Fig. 3 is a vertical sectional view taken substantially along the line 3—3 of Fig. 1 on a larger scale.

Fig. 4 is an enlarged fragmentary sectional view of an adjustable coupling employed in the torque loading device shown.

Figure 1:
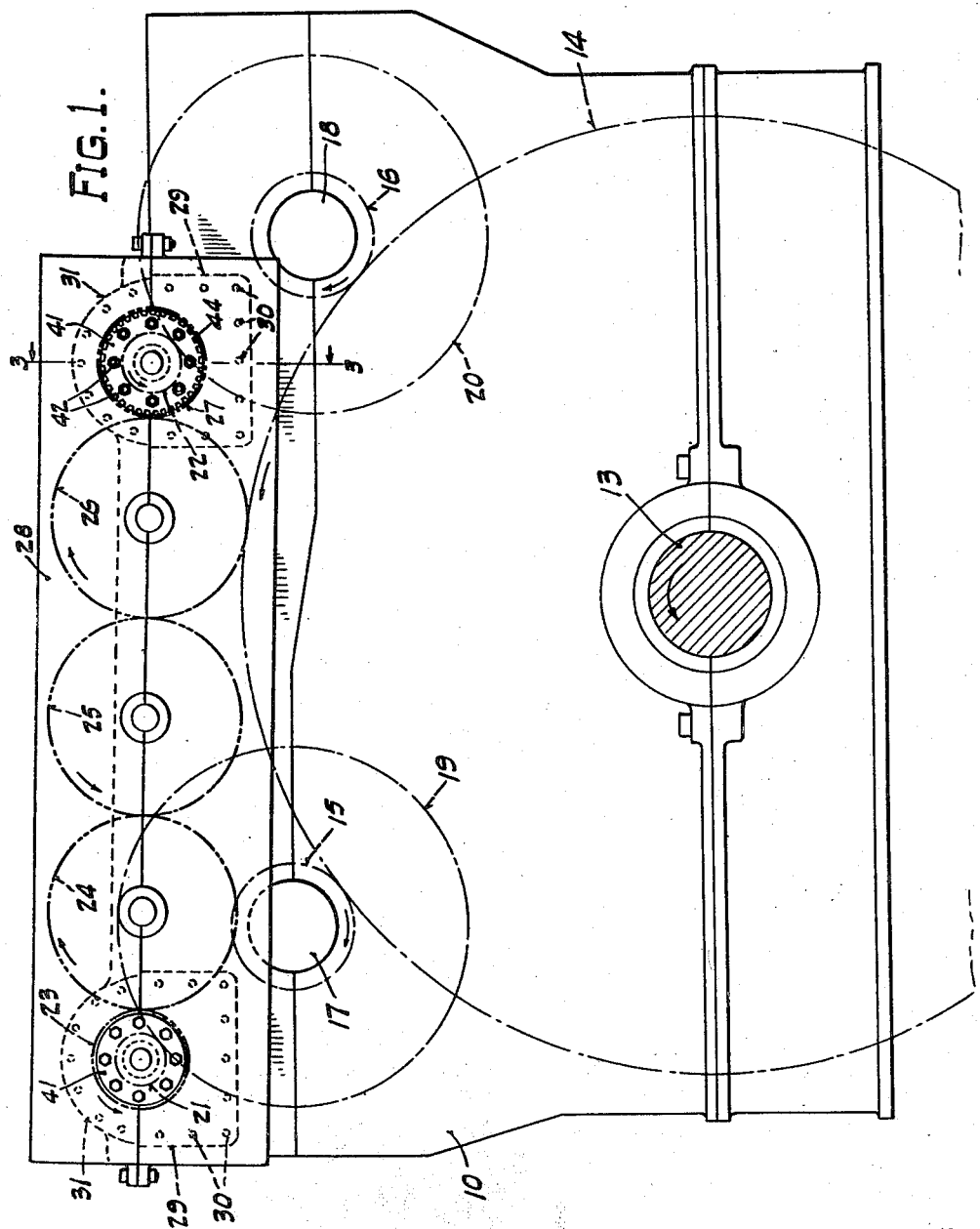
Figure 1 is a front elevational view of a torque loading device constructed in accordance with the present invention and shown applied to a well known type of heavy duty power transmission gear set.

The torque loading device selected for illustration is shown applied to a heavy duty gear set 10 designed to receive power from two steam turbines and to transmit the same to the propeller shaft of a ship or other driven load. In normal use the two high speed pinion shafts 11 and 12 of the gear set shown are separately coupled to and driven by two high and low pressure turbines, respectively, and the low speed shaft 13 is coupled to a propeller or other driven shaft. The shaft 13 is shown equipped with a large gear 14 driven by two pinions 15 and 16 on separate shafts 17 and 18 which are separately driven by gears 19 and 20 fixed thereto and meshing respectively with driving pinions 21 and 22 carried by the separate high speed shafts 11 and 12 above mentioned. Both pinion shafts 11 and 12 are thus operatively connected to the single driven shaft 13 through separate double reduction gear trains. Gear sets of the type shown are commonly employed to transmit eight thousand horse power or more.

The torque loading device shown comprises a train of gears 23, 24, 25, 26 and 27 suitably journalled in an appropriate housing 28 adapted to be removably attached to the gear set housing 10. In this instance the lower half of the housing 28 is shown attached at each end to an extension 29 of the housing 10 by a series of bolts 30, while the upper half of the housing 28 is removably connected at each end to the housing 10 through a suitable adapter 31 bolted or otherwise fixed thereto and attached to the housing 10 by a series of bolts 32. With the housing 28 thus attached to housing 10 the gears of the gear train 23—24—25—26—27 are disposed to provide a torque transmitting connection between the pinion shafts 11 and 12 of the gear set, and for this purpose provision is made for operatively connecting each of the end gears 23 and 27 of the train to one of the pinion shafts. It is of course understood that the gear train is such as to provide a speed ratio between the end gears 23 and 27 thereof precisely equal to the speed ratio between the two driving shafts 11 and 12. Although the gears 23 and 27 might be connected to the drive shafts in various ways, the means shown for that purpose has proven satisfactory and will now be described.

As indicated in Figs. 2 and 3, each of the end gears 23 and 27 of the gear train is supported by a tubular shaft 33 journalled in the housing 28. A torsion shaft 34 is provided extending loosely through each shaft 33 from and in alignment with one of the pinion shafts 11 or 12. An internally toothed hollow coupling head 35 keyed or otherwise fixed to the inner end of each shaft 34 coacts with an externally toothed coupling sleeve 36 keyed or otherwise releasably fixed to the end of the adjacent pinion shaft 11 or 12 to provide an axially separable torque transmitting connection therebetween.

Each torsion shaft 34 is also shown releasably connected at its forward end to the adjacent tubular shaft 33. For this purpose an externally toothed collar 37 is provided on the forward end of each shaft 34 for engagement with an internally tooth encircling sleeve 38, and an externally toothed ring 39 is provided on the forward end of each shaft 33 for engagement with an encircling internally toothed ring 40 all as indicated particularly in Fig. 3. In one instance (as indicated in Fig. 2) the internally toothed ring 40 is shown bolted to the flanged end 41 of the sleeve 38 to complete a torque transmitting connection between the tubular shaft 33 of the end gear 23 and the associated torsion shaft 34, while in the other instance the ring 40 and sleeve 38 are connected by clamp bolts 42 in a manner to permit rotative adjustment therebetween and consequently between the other end gear 27 and the associated torsion shaft 34. As indicated particularly in Fig. 3 the clamp bolts 42 are engaged in a circular T-slot 43 provided in the ring 40 and extend through the end flange 41 of the sleeve 38, so that when drawn tight these bolts securely hold the ring 40 and sleeve 38 in any position of rotative adjustment therebetween.

The arrangement is such that, when the several clamp bolts 42 are released, the sleeve 38 may be rotated relative to the ring 40 to thereby effect rotation of the torsion shaft 34 and pinion shaft 12 relative to the end gear 27. In other words, while the ring 40 is held against rotation to thereby resist rotation of the end gear 27 of the gear train 23—24—25—26—27, the pinion shaft 12 of the main gear set 10 may be rotated by rotation of the sleeve 38 to remove all slack or back lash from the gear set and the gear train and to impose a torque load on the gear train, after which the clamp bolts 42 may be tightened to hold the ring 40 against rotation relative to the sleeve 38 and thereby maintain the torque load thus imposed on the gear set. In this manner the gear set may be subjected to a torque load equal to the load which the gear set is designed to transmit under normal operating conditions, and while it is thus artificially loaded the gear set may be driven throughout the range of speeds for which it is designed to operate in normal use. The gear set may be operated from any suitable power source through suitable mechanism connected to the low speed shaft 13 thereof.

It will thus be noted that rather simple and inexpensive means have been provided for subjecting the gear set to conditions of load and speed substantially identical with the conditions imposed in actual use, thereby rendering it possible to readily and thoroughly test the same at the place of manufacture. In this connection it will be noted that the power required to operate the gear set while artificially loaded in the manner above described need only be sufficient to overcome the friction and other operating losses developed by the gear set and gear train, and therefore only a very small fraction of that required to operate the same under normal conditions of use.

It will of course be understood that during testing, the gear set may be operated in either direction or in both directions alternatively, but for one setting of the sleeve 38 relative to the ring 40 the torque transmitting pressures between the several intermeshing gears of the set occur on one side or face of the teeth only regardless of the direction of operation. To subject the other or opposite sides of the several gear teeth to pressure it is only necessary to rotatably adjust the sleeve 38 relative to the ring 40 in an opposite direction until a torque of opposite magnitude is imposed on the gear set.

In testing heavy duty gear sets of the size indicated considerable power is required to effect the torque loading adjustment between the sleeve 38 and ring 40 in the manner above described and for that reason the end flange 41 of sleeve 38 and the ring 40 are preferably externally toothed, as 44 and 45, or otherwise fashioned to afford adequate purchase thereon of a suitable torque applying tool adapted to effect relative rotation therebetween. In this instance these parts are fashioned to receive a power actuated machine wrench such as that described in my copending application Serial No. 571,517, filed January 5, 1945. The machine wrench therein disclosed is fluid actuated and so designed that the degree of pressure in the motivating fluid may serve to indicate the magnitude of the torque thereby applied to the elements 40 and 41.

In order that the pressure of the motivating fluid supplied to the wrench may serve as a true measure of the torque actually applied to the gear set under test, all friction losses between the sleeve 38 and ring 40 should be reduced to a minimum. For this purpose a series of anti-friction rollers 46 may be interposed between opposed annular shoulders 47 and 48 on the sleeve 38 and ring 40 respectively, as indicated in Fig. 4.

To further reduce friction provision may be made for maintaining the sleeve 38 separated from the ring 40 during relative adjustment therebetween. A convenient means for accomplishing this is shown in Fig. 4. The means therein shown includes a series of rollers 49 adapted to roll against the base of the T-slot 43 in the ring, each roller 49 being journalled in a bifurcated shank 50 carried by a head 51 axially adjustable in a socket 52 formed in the end flange 41 of the sleeve 38. Each head 51 is backed up by a thrust screw 53 provided in the flange 41. A circular series of roller carrying heads 51 are thus provided disposed intermediate the clamp bolts 42.

The arrangement is such that preparatory to effecting a rotative adjustment between the sleeve 38 and ring 40, the several screws 53 are adjusted to effect separation of the sleeve 38 and 40 by the reaction of the several rollers 49 against the base of the T-slot 43. During rotative adjustment of the sleeve 38 the rollers ride along the base of the T-slot 43 and provide an anti-friction separator between the sleeve 38 and ring 40. When this rotative adjustment has been completed, the several screws 53 are retracted so as to release the thrust on the rollers 49 and thereby permit the ring 40 to engage the sleeve 38 under the tightening action of the clamp bolts 42.

Various changes may be made in the embodiment of the invention hereinabove specifically described without departing from or sacrificing the advantages of the invention as defined in the appended claims.

I claim:
1. A device for testing a gear set having a pair of laterally offset intergeared shafts, said device comprising a pair of laterally offset gears connected to effect a speed ratio therebetween equal to the speed ratio between said shafts of the gear set, means for detachably mounting said gears on said gear set in substantial coaxial relation with said shafts respectively, and means for releasably connecting said gears to said shafts respectively, said last named means including a torsionally adjustable member reacting on said gears to impose and maintain a predetermined torque load on said gear set during operation of the latter, said mounting means comprising a structure for positioning the axes of said gears and removable as a unit with said gears from said gear set.

2. A device for testing a gear set having a pair of laterally offset intergeared shafts, said device comprising a pair of laterally offset gears connected to effect a speed ratio therebetween equal to the speed ratio between said shafts of the gear set, means for detachably mounting said gears on said gear set in substantial coaxial relation with said shafts respectively, and means for releasably connecting said gears to said shafts respectively, said last named means including a torsionally adjustable member reacting on said gears to impose and maintain a predetermined torque load on said gear set during operation of the latter, said mounting means comprising a housing in which said gears are mounted and removable as a unit with said gears from said gear set.

3. A device for testing a gear set having a pair of laterally offset intergeared shafts, said device comprising a pair of laterally offset interconnected gears, means for detachably mounting said gears on said gear set in substantial coaxial relation with said shafts respectively, said last named means including a structure for positioning the axes of said gears and removable as a unit with said gears from said gear set, and means including a shaft extending loosely through each of said gears for releasably connecting the same to one of said shafts, said last named means also including a torque transmitting member torsionally adjustable to impose and maintain a predetermined torque load on said gear set during operation of the latter.

4. A device for testing a gear set having a pair of laterally offset intergeared shafts, said device comprising a pair of laterally offset interconnected gears, means for detachably mounting said gears on said gear set in substantial coaxial relation with said shafts thereof, said last named means including a housing for said gears removable as a unit with said gears from said gear set, a shaft extending through each of said gears and said housing, means for releasably connecting one end of each of said last named shafts to one of said first named shafts, and means for connecting the opposite end of each of said shafts to one of said gears, one of said last named means including a member torsionably adjustable to impose a torque load on said gear set.

5. A device for testing a gear set having a pair of laterally offset intergeared shafts, said device comprising a pair of laterally offset gears, connected gears intermeshing therewith to effect a speed ratio between said gears equal to the speed ratio between said shafts, means for detachably mounting said pair of gears on said gear set in substantial coaxial relation with said shafts respectively, said last named means including a housing for all of said gears removable therewith as a unit from said gear set, and means for releasably connecting said pair of gears to said shafts respectively, said last named means including a torsionally adjustable member reacting on said gears to impose and maintain a predetermined torque load on said gear set during operation thereof.

6. A device for testing a gear set having a pair of laterally offset shafts intergeared to operate at different speeds relative to each other, said device comprising a pair of laterally offset gears connected to operate at different relative speeds with a speed ratio therebetween equal to the speed ratio between said shafts, means for detachably mounting said pair of gears on said gear set substantially in coaxial relation with said shafts respectively, said last named means including a structure for positioning the axes of said gears and removable as a unit with said gears from said gear set, and means for releasably connecting said gears to said shafts respectively, said last named means including a torsionally adjustable member reacting on said gears to impose a torque load on said gear set.

LOUIS W. FALK.

REFERENCES CITED

The following references are of record in the file of this patent:

UNITED STATES PATENTS

| Number | Name | Date |
|---|---|---|
| 2,161,956 | Robertson | June 13, 1939 |
| 2,371,607 | Collins | Mar. 20, 1945 |
| 2,283,606 | Lewis | May 19, 1942 |
| 1,198,637 | Kingsbury | Sept. 19, 1916 |
| 1,479,338 | Thomas | Jan. 1, 1924 |
| 2,404,865 | Semar | July 30, 1946 |